Dec. 23, 1958 J. D. DUNN 2,865,670
SCREEN-TYPE GUARD FOR OPERATORS OF
PRISONER TRANSPORTING VEHICLES
Filed June 28, 1956 2 Sheets-Sheet 1

John D. Dunn
INVENTOR.

Dec. 23, 1958   J. D. DUNN   2,865,670
SCREEN-TYPE GUARD FOR OPERATORS OF
PRISONER TRANSPORTING VEHICLES

Filed June 28, 1956   2 Sheets-Sheet 2

John D. Dunn
INVENTOR.

BY *Lawrence A. O'Brien*
*and Harvey B. Jacobson*
Attorneys

United States Patent Office 2,865,670
Patented Dec. 23, 1958

2,865,670

SCREEN-TYPE GUARD FOR OPERATORS OF PRISONER TRANSPORTING VEHICLES

John D. Dunn, Franklin, La.

Application June 28, 1956, Serial No. 594,528

8 Claims. (Cl. 296—24)

This invention generally relates to a safety device and more particularly to a screen-type guard for operators of prisoner transporting vehicles so that the prisoners in the passenger compartment of the vehicle cannot assault or otherwise harm the driver of the vehicle.

It quite often occurs that a regular passenger vehicle such as a two-door or four-door sedan is employed by various police officials for transporting prisoners from one area to another. This is especially true in areas having no patrol wagon for picking up arrested individuals. In cases of this nature, it sometimes occurs that the prisoner riding in the rear seat will attack the driver of a vehicle when the driver is attendant upon his driving chores. This sometimes causes automobile accidents, permits escape of the prisoner and otherwise jeopardizes the police official. Accordingly, it is the primary object of the present invention to provide a guard for the safety and protection of the drivers of ordinary type motor vehicles which are employed for transporting prisoners in certain cases.

Another object of the present invention is to provide a guard in accordance with the preceding object incorporating features which permit the guard to be swung to an out-of-the-way concealed position to permit use of the police vehicle in various capacities so that the guard will not be conspicuous thereby rendering the police car or vehicle easily spotted.

A further object of the present invention is to provide a guard in accordance with the preceding objects which includes features which permit it to be employed in either a four-door or two-door type of vehicle and in the various makes of vehicles having slight variations in width and angles of inclination of the inside walls of the door posts.

Another object of the present invention is the provision of a safety guard or protective guard for operators of prisoner transporting vehicles which is simple in construction, easy to install, safe, well adapted for its intended purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
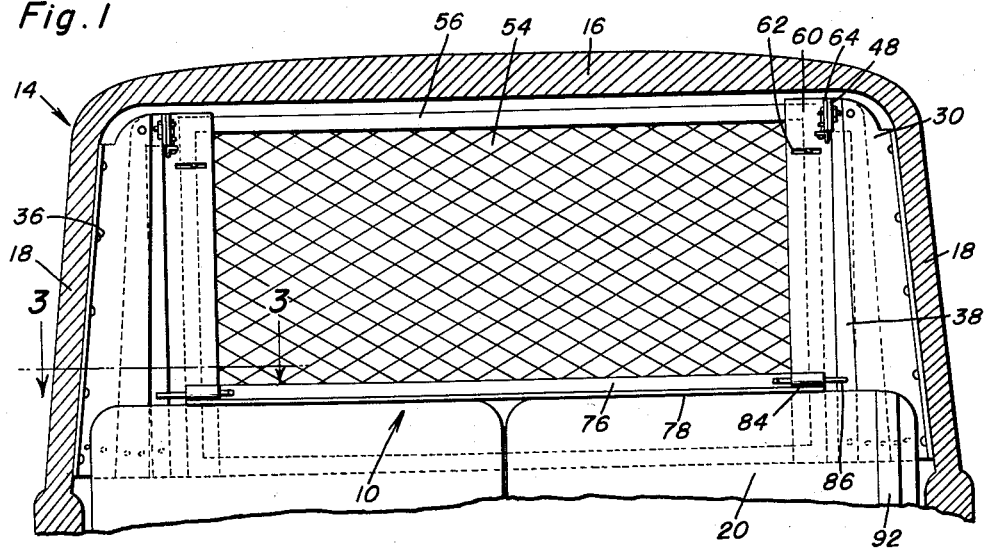
Figure 1 is a transverse sectional view of a vehicle looking from the front seat toward the rear and illustrating the details of construction of the guard of the present invention.
Figure 2:
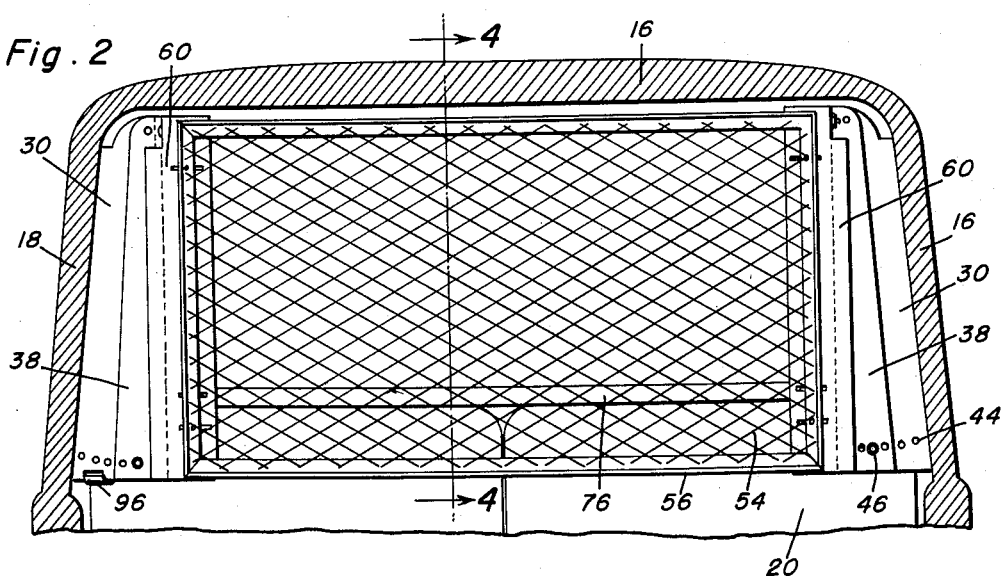
Figure 2 is a transverse sectional view of the construction of the safety guard looking from the rear seat.

Referring now specifically to the drawings, the numeral 10 generally designates the safety guard of the present invention for installation in a sedan type of vehicle generally designated by the numeral 14 which includes a top 16, and sides 18 which are illustrated for the purposes of clarity as being solid, although it will be understood that the top 16 is relatively thin and provided with the usual head liner and the sides 18 are formed by the center post in a four-door vehicle or the forward edge of the body at the door opening in a two-door sedan. The form of the invention illustrated in Figures 1–6 is for installation in a two-door sedan having pivotal seat members 20 for the operator and a front seat passenger so that forward pivotal movement of the seats 20 is necessary for egress or ingress of a passenger in relation to the rear seat.

Figure 6:
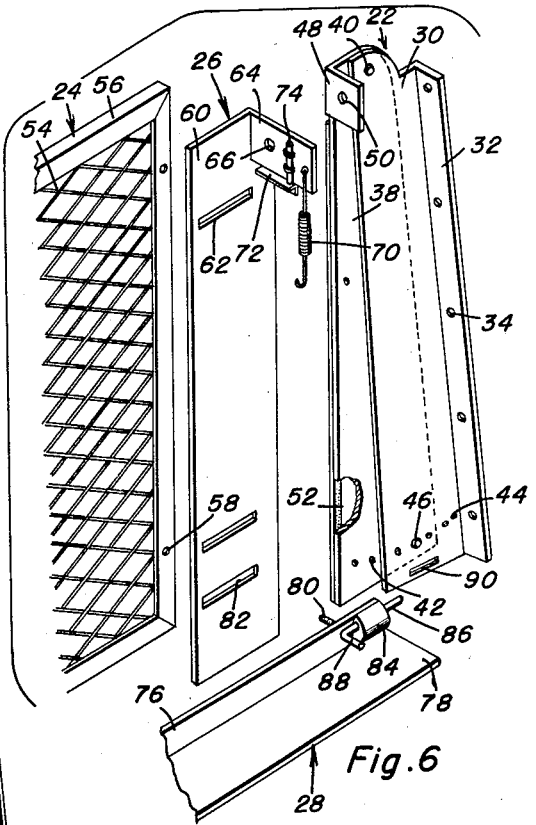
Figure 6 is a partial perspective group view with portions broken away illustrating the elements of the invention.

The present invention incorporates a pair of brackets each designated generally by the numeral 22 for supporting a transverse screen generally designated by the numeral 24 which has a side plate generally designated by the numeral 26 and a forwardly extending plate generally designated by the numeral 28 as will be evident in Figure 6.

The bracket 22 includes an outer vertically disposed plate 30 having a perpendicularly disposed edge 32 with a plurality of apertures 34 for receiving fastening members 36 for mounting the plate 30 against the inner surface of the wall 18. An inner plate 38 is provided in partially overlapping relation to the plate 30 and is hingedly attached thereto at the upper inner corner by a hinge fastener 40 and the lower portion thereof is provided with a series of arcuately arranged apertures 42 for mating engagement with a similar series of apertures 44 in the plate 30 for receiving a fastening member 46 therethrough. This fastening member 46 permits angular adjustment of the outer edge 32 in relation to the vertical to permit the bracket 22 to be installed in vehicles having various angular inclinations of the inner wall 18. The upper inner edge of the plate 38 is provided with a forwardly extending lug 48 having an aperture 50 therein. Also, the plate 38 is provided with a strip of cushioning material 52 on the rear surface thereof for a purpose described hereinafter. The cushioning material 52 may be rubber or a similar type of resilient material.

The screen 24 includes an elongated rectangular member 54 of any suitable screening material or reticulated material of heavy construction. This screen material which may be interwoven wire rod may be provided with a peripheral frame 56 which is of right angular construction thereby forming a rigid screen panel which normally forms a transverse partition in the vehicle 14. The side edges of the frame 56 are provided with a pair of apertures 58 for a purpose described hereinafter.

The side plate 26 includes a vertically elongated rectangular plate 60 having vertically spaced slots 62 therein for overlying the apertures 58 for receiving fastening members for adjustably mounting the side plate 26 on the screen 24 for permitting installation of the device on vehicles having various widths.

Figure 5:
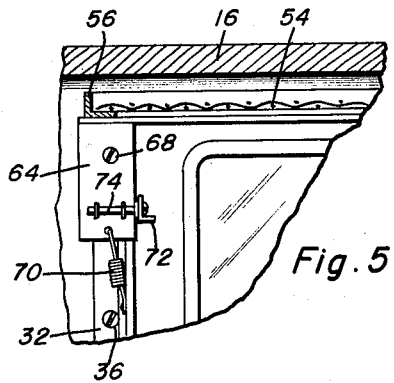
Figure 5 is a fragmental sectional view illustrating the position of the elements of the screen guard when it is in the open horizontal position.

The upper outer edge of the plate 60 is provided with a forwardly extending lug 64 lying alongside the lug 48 and provided with an aperture 66 for receiving a pivot pin or bolt 68 for pivotally mounting the screen 24 to the bracket 22. A tension coil spring 70 interconnects the free end of the lug 64 to the outer plate 38 of the bracket 22 for counterbalancing the screen 24 and urging the same rearwardly to a horizontal position substantially as illustrated in Figure 5. Also provided on the lug 64 is a pivotal lock or button 72 mounted on a bolt 74 which is pivoted downwardly behind the rear surface of the bracket 22 when the screen 24 is raised to its horizontal open position substantially as illustrated in Figure 5 thereby retaining the screen 24 in its open position.

Figure 4:
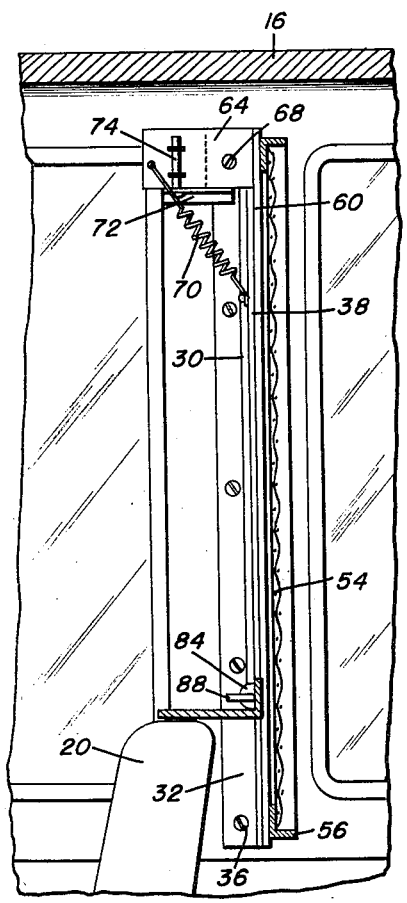
Figure 4 is a sectional view taken substantially upon a plane passing along section line 4—4 of Figure 2 illustrating certain details of construction of the device.

Mounted forwardly adjacent the bottom edge of the screen 24 is the forward plate 28 having an upwardly extending flange 76 secured to the screen 24 and provided with the forwardly extending flange 78 overlying the top edge of the seats 20 substantially as illustrated in Figure 4. The flange 76 is provided with rearwardly extending threaded studs 80 for insertion into a slot 82 on the side plate 60 for mounting the forward plate 28 in position.

Figure 3:
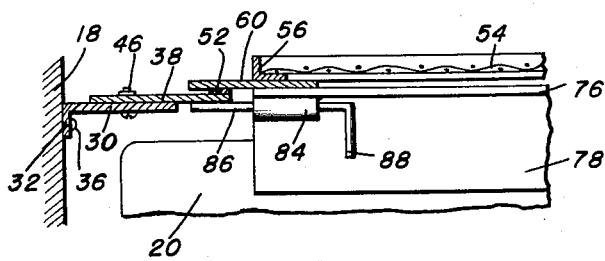
Figure 3 is a detailed sectional view taken substantially upon a plane passing along section line 3—3 of Figure 1 illustrating the details of the latch mechanism for holding the screen in position.

At each end of the upstanding flange 76 is provided a housing 84 for a spring loaded plunger 86 having a forwardly projecting handle 88 thereon whereby the handles 88 are accessible from the driver's compartment or forwardly of the seats 20 for inward movement of the handles 88 thereby withdrawing the plungers 86. The plungers 86 are so arranged that they will overlie the forward surface of the plate 38 when the screen 24 is in vertical position substantially as illustrated in Figure 3. It is also pointed out that the cushioning material 52 on the plate 38 engages the side plate 26 when the screen 24 is in closed position thereby cushioning the downward movement of the panel 24 from an open position to a closed position.

The lower end of the plate 30 may be provided with a slot 90 for receiving a belt 92 which is disposed forwardly over the seat 20 for the driver to sit on to prevent movement of the seat 20 forwardly by foot pressure of the prisoner thereby moving the operator onto the steering wheel which could possibly cause a crash.

Figure 7:
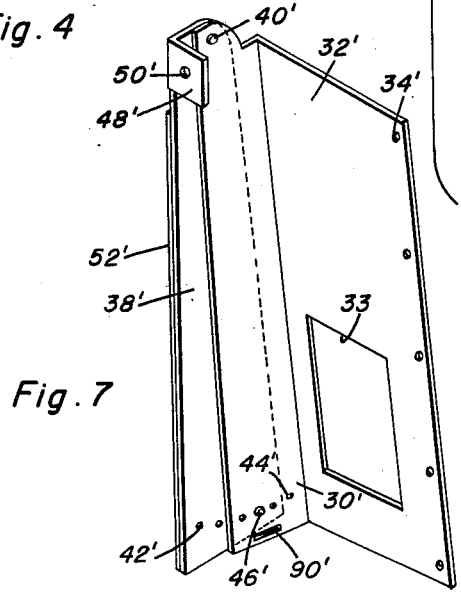
Figure 7 is a perspective view of a modified form of attaching bracket illustrating a bracket employed in conjunction with four-door types of vehicles.

Figure 7 illustrates the modified form of the bracket and the plate 32' is elongated and provided with an enlarged opening 33 for positioning over the door lock push button on the window ledge of a four-door type of sedan which prevents unauthorized operation of the push button locks.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a sedan-type passenger vehicle an attachment for protecting the driver of said vehicle comprising a bracket adapted to be mounted at each side of the vehicle, said brackets being disposed in transverse alignment rearwardly of the driver's seat, a transverse screen member pivotally attached to the upper ends of said brackets and normally forming a transverse partition in the vehicle, latch means interconnecting the lower edge of the screen and the brackets for locking the screen in vertical position, said latch means being operable from the front side of the screen for protecting the driver from attack from rear seat passengers, each of said brackets including a pair of overlapping plates having their upper inner corners pivotally attached and their lower edges adjustably interconnected for varying the angle of the outer edge of the bracket.

2. In combination with a sedan-type passenger vehicle an attachment for protecting the driver of said vehicle comprising a bracket adapted to be mounted at each side of the vehicle, said brackets being disposed in transverse alignment rearwardly of the driver's seat, a transverse screen member pivotally attached to the upper ends of said brackets and normally forming a transverse partition in the vehicle, latch means interconnecting the lower edge of the screen and the brackets for locking the screen in vertical position, said latch means being operable from the front side of the screen for protecting the driver from attack from rear seat passengers, said screen having a peripheral frame with the lower edge thereof projecting below the upper edge of the front seat of the vehicle, said frame including a pair of side mounting plates adjustably attached thereto for varying the effective length of the screen, and a counterbalance spring interconnecting the frame and bracket for urging the frame and screen to a rearward horizontal open position, and lock means for holding the frame and screen in open position adjacent the head liner of the vehicle.

3. The combination of claim 2 wherein said lock means includes a pivotal latch button on the frame swingable to a position in rear of the bracket, said button being mounted on an offset lug on the frame for holding the frame and screen in horizontal position.

4. In combination with a two door passenger vehicle of the type wherein at least one of the two front seats is pivotable forwardly, an attachment for protecting the driver of said vehicle comprising a bracket adapted to be mounted at each side of the vehicle, said brackets being disposed in transverse alignment rearwardly of the driver's seat, a transverse screen member pivotally attached to the upper ends of said brackets and normally forming a transverse partition in the vehicle, latch means interconnecting the lower edge of the screen and the brackets for locking the screen in vertical position, said latch means being operable from the front side of the screen for protecting the driver from attack from rear seat passengers, one of said brackets having a belt attached thereto with the belt extending along the upper surface of the front seat of the vehicle whereby the driver may sit on the belt thereby preventing forward pivotal movement of the front seat.

5. In combination with a sedan-type passenger vehicle an attachment for protecting the driver of said vehicle comprising a bracket adapted to be mounted at each side of the vehicle, said brackets being disposed in transverse alignment rearwardly of the driver's seat, a transverse screen member pivotally attached to the upper ends of said brackets and normally forming a transverse partition in the vehicle, latch means interconnecting the lower edge of the screen and the brackets for locking the screen in vertical position, said latch means being operable from the front side of the screen for protecting the driver from attack from rear seat passengers, said screen having a peripheral frame with the lower edge thereof projecting below the upper edge of the front seat of the vehicle, said frame including a pair of side mounting plates adjustably attached thereto for varying the effective length of the screen, each of said brackets including a pair of overlapping plates having their upper inner corners pivotally attached and their lower edges adjustably interconnected for varying the angle of the outer edge of the bracket.

6. In combination with a sedan-type passenger vehicle an attachment for protecting the driver of said vehicle comprising a bracket adapted to be mounted at each side of the vehicle, said brackets being disposed in transverse alignment rearwardly of the driver's seat, a transverse screen member pivotally attached to the upper ends of said brackets and normally forming a transverse partition in the vehicle, latch means interconnecting the lower edge of the screen and the brackets for locking the screen in vertical position, said latch means being operable from the front side of the screen for protecting the driver from attack from rear seat passengers, said screen having a peripheral frame with the lower edge thereof projecting below the upper edge of the front seat of the vehicle, said frame including a pair of side mounting plates adjustably attached thereto for varying the effective length of the screen, each of said brackets including a pair of overlapping plates having their upper inner corners pivotally attached and their lower edges adjustably interconnected for varying the angle of the outer edge of the bracket, each of said brackets including a forwardly extending edge plate having its forward edge attached to the side of the vehicle and having a large opening aligned with and revealing the push button lock for rear doors of a vehicle so that access thereto from the front seat is provided, said partition being disposed rearwardly of the push button lock whereby a prisoner is prevented from gaining access thereto, one of said brackets having a belt attached thereto with the belt extending along the upper surface of the front seat of the vehicle whereby the driver may sit on the belt thereby preventing forward pivotal movement of the front seat.

7. The combination of claim 6 wherein said lock means includes a pivotal latch button on the frame swingable to a position in rear of the bracket, said button being mounted on an offset lug on the frame for holding the frame and screen in horizontal position.

8. In combination with a four-door sedan passenger vehicle wherein push-button locks are provided on the forward portions of the rear doors, an attachment for protecting the driver of said vehicle comprising a bracket adapted to be mounted at each side of the vehicle, said brackets being disposed in transverse alignment rearwardly of the driver's seat, a transverse screen member pivotally attached to the upper ends of said brackets and normally forming a transverse partition in the vehicle, latch means operable from the front side of the screen only and interconnecting the lower edge of the screen and the brackets for locking the screen in vertical position, each of said brackets including a forwardly extending edge plate having its forward edge fastened to the side of the vehicle, said partition being disposed rearwardly of said push-button lock whereby a prisoner is prevented from gaining access thereto, each edge plate having a large opening in alignment with said push-button lock whereby access thereto from the front seat is provided.

References Cited in the file of this patent

UNITED STATES PATENTS

| | | |
|---|---|---|
| 1,592,168 | Weidman | July 13, 1926 |
| 2,560,106 | Held | July 10, 1951 |
| 2,564,011 | Jensen et al. | Aug. 14, 1951 |
| 2,733,952 | Wright et al. | Feb. 7, 1956 |
| 2,765,191 | Coleman | Oct. 2, 1956 |